Patented Aug. 6, 1935

2,010,780

UNITED STATES PATENT OFFICE 2,010,780

PROCESS FOR TREATING UNHULLED NUTS

Edward M. Chace, Los Angeles, Daniel G. Sorber, El Monte, David H. Rundle, Whittier, and Marston H. Kimball, Alhambra, Calif., dedicated to the free use of the public of the United States of America No Drawing. Application September 20, 1934, Serial No. 744,860

7 Claims. (Cl. 146—219)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the public in the territory of the United States of America to take effect upon the granting of a patent to us.

This invention relates to a novel method for facilitating the removal of hulls from nuts by the use of ethylene gas.

In the past there has been considerable difficulty encountered in separating the hulls from walnuts and other nuts by hand or in the hulling devices commonly in use. Particular difficulty has been met in removing the hulls from so-called "green stick-tight walnuts", from which the hulls can not be wholly removed except by special means.

One of the methods formerly used was to sack the "green stick-tights", place the sacks in piles and keep them thoroughly wet for several days. The hulls could then be removed by the usual methods. This system known as the "Water sweat" is cumbersome and often results in nuts that are off flavored and have dark kernels.

The greatest advantage which will accrue with using the herein disclosed method lies in the advancement of the harvesting time. This time is a critical period in the growth of the walnut, for continued warm weather will cause the kernels to darken with the resulting possibility of the nuts being lowered from first to second grade at a considerable monetary loss to the grower. When by using the ethylene method the harvesting is advanced from a week to 10 days, the possibility of such injury is greatly lessened. Without the use of ethylene early harvesting is impossible, owing to the large percentage of green sticktight nuts which would be encountered. There is of course a limit to the advancement of harvesting time, for when the immature nuts are harvested the kernels tend to shrivel, and are poorly flavored.

In carrying out the treatment the nuts after harvesting are placed in boxes or bins, or other containers of such type that circulation of air between the nuts will not be impeded. We have found that cloth sacks are not as satisfactory as open containers, owing to the fact that moisture condenses on the cloth and impedes the circulation through the contents, very often causing mold growth, both on the sacks and on the nuts contained in them. The containers are placed in or located in an enclosure which is reasonably gas-tight. Ethylene gas ($C_2H_4$) is forced into the enclosure in the proportion of 1 part to 1000 parts of the gross air space enclosed. The proportion given is considered by us to be the maximum necessary, but results can be obtained by using greater or less than the proportion mentioned.

The ethylene gas may be used by what is known as the "shot" system where the required amount of gas is placed in the enclosure at one time, or by the "trickle" system, where a continuous ventilation of the enclosure is carried out with the proper amount of ethylene gas introduced into the air current. Where the shot system is used the gas must be renewed every 6 to 12 hours, the enclosures being thoroughly ventilated before each renewal of the gas.

Furthermore, the boxes or other containers may be stacked and covered with canvas, the gas being run into the stack under the canvas. Care must be taken that the location of such stacks is in a place sheltered from drafts or wind. Otherwise the gas will be swept out of the enclosure before any beneficial results can be obtained. When canvas is used the amount of ethylene placed in the enclosure must be somewhat increased.

In all cases a temperature of from 65 to 85° F. must be maintained in the enclosure. The optimum temperature is approximately 75° F. Lower temperatures tend to slow down the reaction while higher temperatures may cause the color of the kernel to be dark. Frequent ventilation of the enclosure is necessary, in all cases, ventilation and air control should be such that excess moisture will not deposit on the nuts.

If proper temperature and humidity are maintained in the enclosures the hulls of the nuts will become crisp and friable in from 36 to 84 hours, so that they will be easily removed by the hulling devices commonly used or by hand.

Having fully disclosed our invention, we claim:

1. The process of removing hulls from unhulled nuts which comprises placing the unhulled nuts in a substantially gas-tight enclosure, introducing ethylene gas into the enclosure in contact with the unhulled nuts, allowing the unhulled nuts to remain in contact with the ethylene gas until the hulls become crisp and friable, then removing the nuts from the enclosure and stripping the hulls from the nuts.

2. In the process of removing hulls from unhulled nuts the steps of confining the unhulled nuts in a substantially gas-tight enclosure, introducing sufficient ethylene gas into said enclosure and in contact with such nuts to establish a concentration in the enclosure of 1 part gas to 1,000 parts air, allowing the nuts to remain in the enclosure and in contact with the gas from 36 to 84 hours, maintaining a temperature in the enclosure of 65° to 85° F. and ventilating the enclosure to prevent the deposit of excess moisture on the nuts.

3. In the process of removing hulls from unhulled walnuts the steps of confining the unhulled walnuts in a substantially gas-tight enclosure, introducing sufficient ethylene gas into said enclosure and in contact with such walnuts to establish a concentration in the enclosure of 1 part gas to 1,000 parts air, allowing the walnuts to remain in the enclosure and in contact with the gas from 36 to 84 hours, maintaining a temperature in the enclosure of 65° to 85° F. and ventilating the enclosure to prevent the deposit of excess moisture on the walnuts.

4. The process of rendering the hulls on unhulled nuts crisp and friable to facilitate their removal from the nuts which comprises maintaining in substantially gas-tight chambers containing unhulled nuts a concentration of ethylene gas sufficient to render the hulls crisp and friable.

5. The process of rendering the hulls on unhulled walnuts crisp and friable to facilitate their removal from the walnuts which comprises maintaining in substantially gas-tight chambers containing unhulled walnuts a concentration of ethylene gas sufficient to render the hulls crisp and friable.

6. The process of rendering the hulls on unhulled nuts crisp and friable to facilitate the removal of the hulls from the nuts, which comprises maintaining in substantially gas-tight chambers containing unhulled nuts a concentration of ethylene gas sufficient to render the hulls crisp and friable, maintaining a temperature of 65° to 85° F. in the chambers and ventilating the chambers to prevent the deposit of excess moisture on the nuts.

7. The process of rendering the hulls on unhulled walnuts crisp and friable to facilitate the removal of the hulls from the walnuts, which comprises maintaining in substantially gas-tight chambers containing unhulled walnuts, a concentration of ethylene gas sufficient to render the hulls crisp and friable, maintaining a temperature of 65° to 85° F. in the chambers and ventilating the chambers to prevent the deposit of excess moisture on the walnuts.

EDWARD M. CHACE.
DANIEL G. SORBER.
MARSTON H. KIMBALL.
DAVID H. RUNDLE.